Feb. 2, 1965 P. G. SMEE 3,168,622

DIAL PULSE REPEATER

Filed March 16, 1959

INVENTOR.
Peter G. Smee

BY [illegible]

ATTORNEY

United States Patent Office 3,168,622 Patented Feb. 2, 1965

3,168,622

DIAL PULSE REPEATER

Peter G. Smee, Lynchburg, Va., assignor to General Electric Company, a corporation of New York Filed Mar. 16, 1959, Ser. No. 799,508
8 Claims. (Cl. 179—16)

Figure 1:
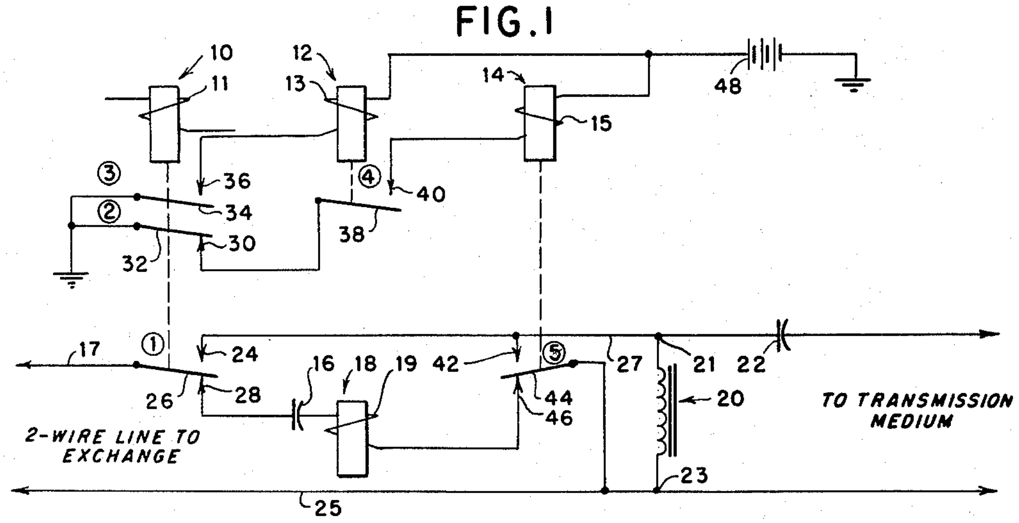

This invention relates to switching circuits and particularly to an improved relay circuit which may be utilized advantageously in automatically operated communication systems.

In automatic telephone systems, the need frequently arises for an operation to be performed only while dial pulsing is taking place. For example, when trains of dial pulses are being received at an exchange, it is necessary to disconnect the transmission circuits of the exchange and connect the dial pulsing relays to the line. Immediately, after dial pulsing is completed, the pulsing relays must be automatically disconnected and the transmission circuits reconnected to the line. By such automatic operation during the reception of dial pulses, the isolation of the "ring out" relay and the transmission line impedance is accomplished and the incoming dial pulse trains are switched to the central exchange without causing the distortion of dial pulses which would occur if they were passed through the transmission line impedance and the ring out relay reactance.

Heretofore, the conventional isolating circuits used for the above described operation have embodied a group of at least three relays. The utilization of this many relays in such isolating circuits presents many disadvatages. Thus, electromagnetic relays are relatively expensive and the more relays utilized in an isolating circuit, the more expensive, massive and complex is such circuit. In addition, with more relays used in a circuit, more relay clicking and consequently more dial pulse clicks are transmitted back to a subscriber utilizing the telephone.

Accordingly, the primary object of this invention is to provide an improved switching circuit advantageously utilizable as an isolating circuit in an automatic telephone system.

It is a further object of this invention to provide an isolating circuit as set forth in the preceding object which is simpler, lighter and less complex than presently used isolating circuits.

It is another object to provide a circuit advantageously utilizable in an automatic telephone system for isolating the transmission line and ring out relay impedances when dial pulsing is taking place, such circuit embodying a minimal amount of electromagnetic relays.

Generally speaking, in accordance with the invention, there is provided a circuit comprising first relay means having a release time such that its deenergization substantially corresponds to the end of a pulse of electrical energy applied thereto, second relay means having a release time such that its deenergization occurs at a time later than the end of a pulse of electrical energy applied thereto, a source of unidirectional current and means for storing electrical energy. There is also provided means associated with the first relay means for placing the storage means in circuit with the unidirectional current source in response to the energization of the first relays means to permit the storage means to store electrical energy and for removing the storage means from the circuit with the unidirectional current source and placing it in circuit with the second relay means in response to the deenergization of the first relay means to apply the stored electrical energy to second relay means thereby energizing the latter. The application of a train of pulses to the first relay means and having pulse widths shorter than the release time of the second relay means repeatedly causes the storage means to be placed into and removed from circuit with the unidirectional current source, the second relay means thereby remaining energized substantially throughout the whole duration of the pulse train.

For additional objects and advantages and for a better understanding of the invention, attention is now directed to the following description and accompanying drawing. The features of the invention believed to be novel are particularly pointed out in the appended claims.

In the drawing where identical elements have been given the same designating numerals in all the figures, FIG. 1, is a diagram of a conventional isolation circuit.

Figure 2:
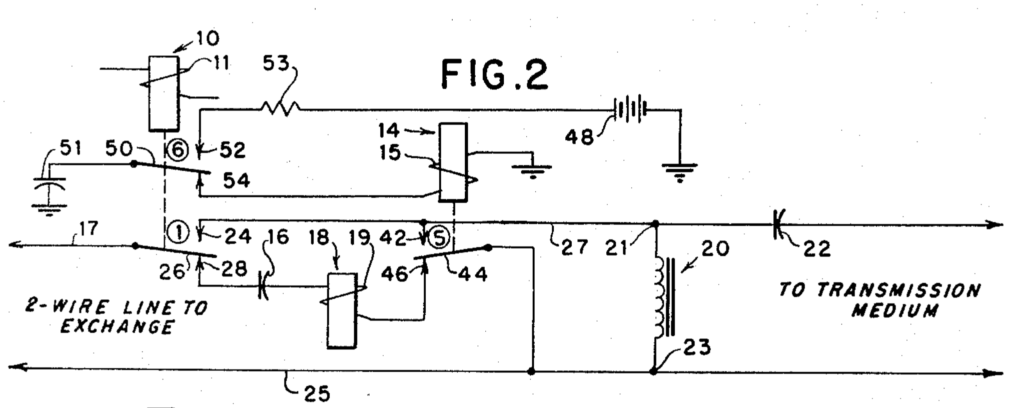
Figure 3:
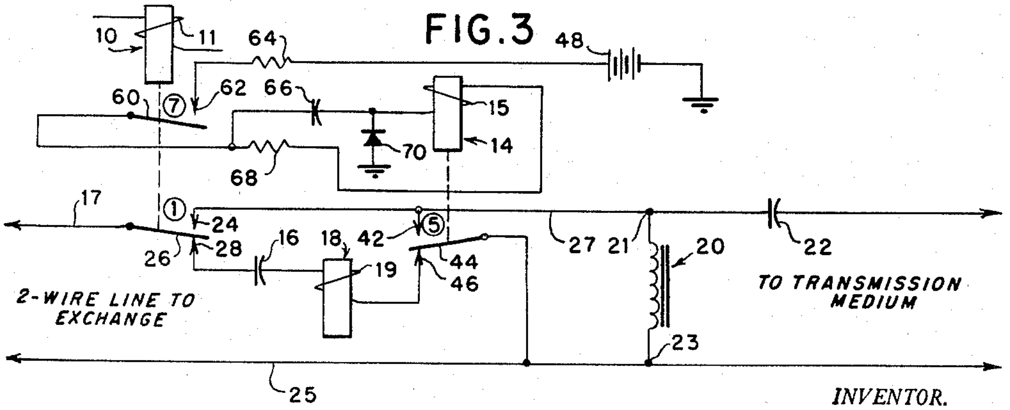

FIG. 2 is a depiction of an embodiment of an isolation circuit employing the principles of this invention, and, FIG. 3 is a diagram illustrating another embodiment of the invention.

Referring now to FIG. 1 of the drawing, there is illustrated a conventional electromagnetic relay operated circuit which is utilized in automatic telephone systems for isolating the ring out relay and transmission circuits from the line during the dial pulsing operation. The circuit comprises a first electromagnetic relay 10 having a coil 11, a second electromagnetic relay 12 having a coil 13 and a third electromagnetic relay 14 having a coil 15. There is also shown the two wire line to the telephone exchange across which are normally connected a series combination of a capacitor 16 and the ring out relay 18 having a coil 19. The arrows on the transmission line in FIG. 1 are included for convenience of understanding to show the connections thereof and not the direction of current flow therein. This drawing convention is also utilized in FIGS. 2 and 3. Connected across the transmission line is the transmission circuit schematically depicted as an inductor 20, the ends 21 and 23 of inductor 20 being respectively connected to the respective wires of the transmission line. A capacitor 22 is provided at end 21 of inductor 20 substantially as shown. As depicted in FIG. 1, relays 10, 12 and 14 are all in the unenergized state.

Associated with relay 10 is a set of contacts (1) comprising contact members 24, 26 and 28. With relay 10 in the unenergized state, contact members 26 and 28 are normally in closed relationship. Thereby, one end of ring out relay coil 19 which is connected to contact member 28 through capacitor 16 is normally connected to one wire 17 of the two wire line to the exchange. When relay 10 is energized, contact members 26 and 28 open and members 24 and 26 assume the closed position whereby ring out relay 18 is disconnected from line 17. Also associated with relay 10 is a second set of contacts (2) comprising contact members 30 and 32 which are normally closed when relay 10 is in the unenergized state, contact member 32 being connected to ground and a third set of contacts (3) comprising contact members 34 and 36 which are normally open when relay 10 is in the unenergized state. Contact member 34 is connected to ground and contact member 36 is connected to one end of coil 13 of relay 12.

Associated with relay 12 is a set of contacts (4) comprising members 38 and 40 which are normally open when relay 12 is unenergized, contact member 38 thereof being connected to contact member 30 of relay 10 and contact member 40 being connected to an end of coil 15 of relay 14.

Associated with relay 14 is a set of contacts (5) comprising members 42, 44, and 46. When relay 14 is unenergized, contact members 44 and 46 are normally closed, contact member 46 being connected to the other end of ring out relay coil 19 and contact 44 being connected to wire 25. Contact member 42 is connected to wire 27. When relay 14 is energized, contact members 44 and 46 open and contact members 44 and 42 assume the closed position. As a consequence thereof, ring out relay 18 is disconnected from the line and the transmission circuit depicted by inductor 20 is short circuited. The other ends of coils 13 and 15 respectively are connected to a unidirectional current source which may be a battery 48 or the like.

Considering the operation of the circuit of FIG. 1, when a subscriber's phone at a remote point from the exchange is "on hook," i.e., unused, relays 10, 12 and 14 are in the unenergized state and the line from the exchange is connected to the ring out relay 18 so that ringing current from the exchange can actuate the ring out relay and thus operate the subscriber's bell at the remote point. When the subscriber wishes to initiate a call, his removing the receiver from its hook results in the energization of relay 10. The circuit arrangement for energizing relay 10 by such removal of the receiver is not shown in FIG. 1 since it is conventional and well known in the art. Such circuit arrangement for example is disclosed in U.S. Patent 1,530,580 to A. B. Smith, issued on March 24, 1925.

With the energization of relay 10, contact members 24 and 26 close and contact members 26 and 28 open to close the loop from the exchange to the transmission line. Simultaneously, contact members 30 and 32 open and contact members 34 and 36 close to provide a circuit from source 48 through relay coil 13 and closed contact members 34 and 36 to ground.

The providing of the latter circuit energizes relay 12 whereupon contact members 38 and 40 thereof close thereby connecting the end of coil 15 of relay 14 to now closed contact members 38 and 40. As is seen, at this point relay 14 is not yet energized since contacts 30 and 32 of relay 10 are open. However, with the closing of contact members 38 and 40, relay 14 in effect, is prepared for such energization. In this connection, it is to be noted that relay 10 is usually chosen to have a relatively rapid release time whereas relays 12 and 14 are generally chosen to be the "slow to release" type. Now, as soon as the subscriber dials, relay 10 at the completion of a dial pulse will be momentarily deenergized with the consequent restoration of the contact members associated therewith to their normal position during their unenergized state. However, relay 12 which has been chosen to be the slow to release type does not become deenergized at the completion of a dial pulse and consequently relay 14 is energized by the circuit completed from source 48, through coil 15, closed contact members 40 and 38 of energized relay 12 and closed contact members 30 and 32 of deenergized relay 12. Because relays 12 and 14 are of the slow to release type, they both remain energized as long as relay 10 is being pulsed by a train of dial pulses. Of course, the widths of such dial pulses are preferably not as long as the release time of relays 12 and 14. At the end of a short period after the determination of a dial pulsing, relays 12 and 14 are also deenergized thereby restoring all the contact members in the circuit to their normal unenergized positions.

It is thus seen that with the energization of relay 14, the ring out relay 18 is removed from the circuit due to the consequent closing of contact members 42 and 44 and the opening of contact members 44 and 46. Also, the transmission circuit symbolized by inductor 20 is short circuited. The short circuiting of the latter minimizes distortion of the dial pulses being received at the exchange and also minimizes the transmission of dial clicks back to the subscriber.

In order to reduce cost, size, mass and complexity of the circuit described in FIG. 1, and substantially to minimize further the dial clicking transmitted back to the subscriber, there has been provided this invention, separate embodiments of which are depicted in FIGS. 2 and 3.

Referring now to FIG. 2 wherein the depicted transmission line and associated components are identical with that of FIG. 1, it is first seen that relay 12 of the circuit of FIG. 1 and its associated contacts have been completely eliminated. Also, instead of requiring both sets of contacts (2) and (3) of relay 10, relay 10 has instead associated therewith the set of contacts (6) which comprises a contact member 50 connected to ground through a capacitor 51, a contact member 52 connected to the unidirectional current source 48 through a resistor 53 and a contact member 54 connected to one end of coil 15 of relay 14, the other end of coil 15 being no longer connected to the unidirectional current source 48 as in the circuit of FIG. 1 but instead being directly connected to ground. In the unenergized state, contacts 50 and 54 are normally closed.

In the operation of the circuit of FIG. 2, when relay 10 is energized due to the subscriber's removing his phone from its hook, contact members 50 and 54 open and contact members 50 and 52 close thereby completing the circuit from source 48 through resistor 53, closed contact members 50 and 52 and capacitor 51 to ground. This permits capacitor 52 to be charged from source 48, resistor 53 serving to limit the surge current during the charging period. Now, as soon as a subscriber begins to dial the momentary deenergization of relay 10 at the end of a dial pulse with the consequent opening of contact members 52 and 50 and the closing of contact members 54 and 50 permits capacitor 51 to discharge through coil 15 it having been placed back into circuit with the coil 15 of relay 14 by the closing of contact members 50 and 54. This results in the energization of relay 14 and all the effects as described in connection with the explanation of the operation of the circuit of FIG. 1 once again occur. Due to the chosen slow to release time of relay 14 it will remain energized as long as the dial pulsing of relay 10 permits capacitor 51 to alternately charge from source 48 and discharge through coil 15 of relay 14.

In FIG. 3, wherein there is illustrated the same transmission line as in FIGS. 1 and 2, there is shown another embodiment of the invention. In this embodiment, relay 10 has associated therewith a set of contact members (7) comprising contact members 60 and 62 which are normally open when relay 10 is in the unenergized state. Contact member 62 is connected to the unidirectional current source 48 through a resistor 64 and contact member 60 is connected to one side of a capacitor 66. The other side of capacitor 66 is connected to one end of coil 15 of relay 14, the other end of coil 15 being connected to the junction point of contact member 60 and capacitor 66 through a resistor 68. Connected between ground and the junction point of coil 15 and capacitor 66 is diode 70 poled in the forward direction of current flow with respect to ground. Diode 70 may suitably be of the semiconductor type.

In the operation of the circuit of FIG. 3, when relay 10 is energized due to the removal of the receiver from its hook by the subscriber, contact members 60 and 62 close and capacitor 66 charges through these closed contacts and diode 70. At the completion of a dial pulse, the momentary deenergization of relay 10 permits capacitor 66 to discharge through resistor 68 and coil 15 of relay 14 thereby energizing relay 14. The latter now remains energized during the duration of the dial pulsing of relay 10 in the same manner as described herein above in the explanation of the operation of the circuits of FIGS. 1 and 2. Similarly, the ring out relay 18 is removed from circuit during the dial pulsing and the transmission circuit, depicted by inductor 20 is short circuited.

While there have been described what are at present considered to be the preferred embodiments of this invention, it will be obvious to those skilled in the art that various changes and modifications may be made therein without departing from the invention and it is, therefore, aimed in the appended claims to cover all such changes and modifications as fall within the spirit and scope of the invention.

What is claimed is:

1. A circuit comprising first relay means having a release time such that its deenergization substantially corresponds to the end of a pulse of electrical energy applied thereto said first relay means including first and second contacts and armature means operative therebetween, second relay means connected to said second contact and having a release time such that its deenergization occurs at a time after the electrical energy applied thereto is terminated, a source of unidirectional current, means for storing electrical energy, said armature being moved against said first contact for connecting said storing means into circuit with said source to charge said storing means upon energization of said first relay, said armature being moved against said second contact upon deenergization of said first relay means for removing the storing means from the circuit with the unidirectional current source and placing it in circuit with the second relay means to apply the stored electrical energy to the second relay means thereby energizing the latter, the application of a train of pulses having widths shorter than the release time of said second relay means repeatedly causing said storage means to be placed into and removed from circuit with the unidirectional current source, said second relay means remaining energized substantially throughout the whole duration of said pulse train.

2. A circuit comprising first electromagnetic means having a release time such that its deenergization occurs substantially coincidentally with the end of a pulse of electrical energy applied thereto, said first electromagnetic means including first and second contacts and armature means operative therebetween second electromagnetic means connected to said second contact and having a release time such that its deenergization occurs at a time after the electrical energy applied thereto is terminated, a source of unidirectional current, a capacitance, the armature of said first electromagnetic means being moved against said first contact for connecting said capacitance in circuit with said unidirectional current source whenever said first electromagnetic means is energized to charge said capacitance, said armature being moved against said second contact upon deenergization of said first electromagnetic means to disconnect said capacitance from circuit with said unidirectional current source and connect it in circuit with said second electromagnetic means thereby permitting said capacitance to discharge through and energize said second electromagnetic means, the application of a train of pulses having widths shorter than the release time of said second electromagnetic means to said first electromagnetic means alternately and repeatedly causing said capacitance to be placed and removed from circuit with said unidirectional current source, said second electromagnetic means remaining energized substantially throughout the whole duration of said pulse train.

3. A circuit comprising a first electromagnetic relay having a relatively short release time, said first relay having first and second contacts and armature means movable therebetween a second electromagnetic relay connected to said second contact and having a relatively long release time, a capacitance, a source of unidirectional current, the armature of said first relay being moved against said first contact for connecting said capacitance into circuit with said source whenever said first relay is energized to charge said capacitance, said armature being moved against said second contact for connecting said capacitance in circuit with said second relay upon deenergization of said first relay to permit the discharge of said capacitance through said second relay thereby energizing said second relay, the application of a train of pulses having widths shorter than the release time of said second relay alternately repeatedly causing said capacitance to be charged and then discharged through said second relay, said second relay remaining energized substantially throughout the duration of the pulse train.

4. A circuit comprising a first electromagnetic relay having a relatively short release time and including a coil member, first, second and third contacts associated with said first relay, said first and second contacts being in the closed position when said first relay is in the unenergized state, said second and third contacts being in the closed position when said first relay is in the energized state, a source of unidirectional current connected to said third contact, a capacitance connected between said second contact and a source of reference potential, a second electromagnetic relay including a coil member and having a relatively long release time, one end of said second relay coil being connected to said first contact, the other end of said relay coil being connected to said reference potential, the energization of said first relay causing said second and third contacts to assume a closed position to place said capacitance in circuit with said unidirectional current source to charge said capacitance, the deenergization of said first relay causing said first and second contacts to assume a closed position to place said capacitance in circuit with said second relay coil to permit the discharge of said capacitance through said second relay coil thereby energizing said second relay, the application of a train of pulses having widths shorter than the release time of said second relay to said first relay causing the alternate charging and discharging of said capacitance, said second relay remaining energized substantially throughout the duration of said pulse train.

5. A circuit comprising a first electromagnetic relay having a relatively short release time and including a coil, first, second and third contact members associated with the said first relay, said first and second contact members being in the closed position when said first relay is in the deenergized state, said second and third contact members being in the closed position when said first relay is in the energized state, a resistance, a source of unidirectional current connected to said third contact member through said resistance, a capacitance connected between said second contact member and a source of reference potential, a second electromagnetic relay having a relatively long release time and including a coil, one end of said second relay coil being connected to said third contact member, the other end of said second relay coil being connected to said reference potential, the energization of said first relay coil causing said second and third contact members to close to place said capacitance in circuit with said resistance and said unidirectional current source to charge said capacitance, the deenergization of said first relay coil causing said second and third contact members to open and said first and second contact members to close to place said capacitance in circuit with said second relay coil to permit its discharge therethrough thereby energizing said second relay, the application of a train of pulses to said first relay causing the alternate charging and discharging of said capacitance, said second relay remaining energized substantially throughout the duration of the application of said pulse train.

6. A circuit comprising a first electromagnetic relay having a relatively short release time including a coil, first and second contact members, said contact members being in the open position when said first relay is in the unenergized state and in the closed position when said first relay is in the energized state, a first resistance, a source of unidirectional current connected to said first contact member through said first resistance, a second electromagnetic relay having a relatively long release time and including a coil, a second resistance, one end of said second relay coil being connected to said second contact member through said second resistance, a capacitance, the other end of said second relay coil being connected to said second member through said capacitance, a unidirectional conducting device connected between the junction of said other end and said capacitance and a reference potential, said unidirectional conducting device being poled in the forward direction of current flow with respect to said reference potential, the energization of said first relay coil causing said contact members to close to place said capacitance in circuit with said unidirectional current source to charge said capacitance, the deenergization of said first relay coil causing said contact members to open, said capacitance discharging through said second relay coil thereby energizing said second relay, the application of a train of pulses having widths shorter than the release time of said second relay to said first relay causing the alternate charging and discharging of said capacitance, said second relay remaining energized substantially throughout the duration of the application of said pulse train.

7. In an automatic telephone system including a transmission line from an exchange to a remote point, a ring out relay through which ringing current is provided to said remote point, and transmission circuits in said line; a circuit for isolating said ring out relay and said transmission circuits from said line during dial pulsing comprising a first electromagnetic relay adapted to be energized when said line is in use and to be deenergized thereafter upon the application of a dial pulse thereto, said first relay having a release time such that its deenergization occurs substantially coincidentally with the end of a pulse applied thereto, a second electromagnetic relay having a release time such that its deenergization occurs at a time later than the end of a pulse applied thereto, a source of unidirectional current, a capacitance, said first relay connecting said capacitance in circuit with said source for charging said capacitance and simultaneously connecting said exchange to said transmission line in response to the energization of said first relay, said first relay removing said capacitance from said circuit and placing it in circuit with said second relay upon deenergization of said first relay, said capacitance discharging through and energizing said second relay thereby, said second relay removing said ring out relay and said transmission circuits from said line in response to its energization, the application to said first relay of a train of pulses having widths shorter than the release time of said second relay to said first relay alternately repeatedly causing said capacitance to charge and then discharge through said second relay, said second relay remaining energized substantially throughout the duration of the application of said pulse train.

8. In an automatic telephone system including a two wire transmission line, a two wire line to an exchange from said transmission line, a ring out relay through which ringing current is provided to a remote point, and transmission circuits connected across the wires of said transmission line; a circuit for isolating said ring out relay and said transmission circuits from said line during dial pulsing comprising a first electromagnetic relay adapted to be energized when said line is placed into use and to be deenergized thereafter upon the application of a dial pulse thereto, said first relay having a relatively short release time, a source of unidirectional current, a first resistance, a first contact member associated with said first relay connected to said source through said first resistance, a second electromagnetic relay having a relatively long release time, a second resistance, a second contact member associated with said first relay connected to one end of said second relay through said second resistance, a capacitance, the other end of said second relay being connected to said second contact member through said capacitance, a unidirectional conducting device connected between a reference potential and the junction of said capacitance and said other end, said conducting device being poled in the forward direction of current flow with respect to said reference potential, said first and second contact members assuming the open position when said first relay is in the unenergized state and the closed position when said first relay is in the energized state, a third contact member associated with said first relay connected to one wire of said transmission line, a fourth contact member associated with said first relay connected to one wire to said exchange, a fifth contact member associated with said first relay connected to one end of said ring out relay, said fourth and fifth contact members assuming the closed position when said first relay is in the unenergized state and said third and fourth contact members assuming the closed position when said first relay is in the energized state, a sixth contact member associated with said second relay connected to said one wire of said transmission line, a seventh contact member associated with said second relay connected to the other wire of said transmission line, an eighth contact member associated with said second relay connected to the other end of said ring out relay, the energization of said first relay causing the first and second contact members associated therewith to close to place said capacitance in circuit with said first resistance and said source, the capacitance being charged thereby and simultaneously causing said third and fourth contact members associated with said first relay to assume the closed position thereby connecting said exchange to said transmission line, the deenergization of said first relay causing the contact members associated therewith to assume their positions when said first relay is in the unenergized state thereby placing said capacitance in circuit with said second relay, said capacitance discharging through and energizing said second relay thereby, the energization of said second relay causing the sixth and seventh contact members associated therewith to assume the closed position to remove said ring out relay from said transmission line and to short circuit said transmission circuits, the application to said first relay of a train of pulses having widths shorter than the release time of said second relay alternately repeatedly causing said capacitance to be charged and then discharged through said second relay, said second relay remaining energized substantially throughout the duration of the application of said pulse train.

References Cited in the file of this patent

UNITED STATES PATENTS

| | | |
|---|---|---|
| 1,589,409 | Miller | June 22, 1926 |
| 1,688,687 | Low | May 8, 1928 |
| 2,339,438 | Thompson | Jan. 18, 1944 |
| 2,490,810 | Horwitz | Dec. 13, 1949 |
| 2,495,725 | Horwitz | Jan. 31, 1950 |

ROBERT H. ROSE, *Primary Examiner.*

L. MILLER ANDRUS, WILLIAM C. COOPER, *Examiners.*